United States Patent Office 3,553,684
Patented Jan. 5, 1971

3,553,684
DIGITAL ANALOG CONVERTERS
Gerhard Jehne, Jena, and Ewald Klier, Oberweimar, Germany, assignors to VEB Carl Zeiss Jena, Jena, Gera, Germany
Filed Dec. 6, 1967, Ser. No. 688,627
Int. Cl. H03k 13/04
U.S. Cl. 340—347                                    6 Claims

ABSTRACT OF THE DISCLOSURE

In a digital analog converter for positioning machines and measuring instruments, the desired value obtained from an information carrier is transformed into an analog electric magnitude by selectively connecting in series the output windings of a digital transformer. The electric magnitude analogous to the desired value is compared with the real value that corresponds to the momentary position of the machine, the real value being the voltages at the wipers of a plurality of potentiometers. The comparison, in temporal sequence from the highest digit to the lowest, is made at each of the potentiometers by causing a balancing circuit so to influence the real value at each digit as to reduce the difference between desired value and real value to zero. Balancing takes place in such a manner that each step compares the residual quntity of the step preceding it.

---

This invention relates to digital analog converters converting digital electric quantities into analogous geometrical ones. Such converters enable settings in machines and measuring instruments to be made by the input of electric digital values obtained from any information store.

Apparatus of the foregoing kind are known which operate on the principle of voltage compensation and assure that this compensation is independent of the absolute voltage. Alternating-current voltage is preferred to direct-current voltage, since the derivation of partial D.C. voltages presents some difficulties.

It is also known that the setting accuracy obtainable with digital analog converters can be increased by converting the input values separately in a coarse and a fine system. In the prior proposed apparatus, however, this improvement involves a comparatively great display of electric and mechanical means.

The present invention aims at considerably increasing the accuracy of automatic data recording and conversion in digital analog converters without undue financial and technical expenditure.

To this end the invention consists in a digital analog converter in which the entire desired input value is compared in chronological sequence from the highest digit to the lowest by means of a plurality of balancing circuits, or by means of one balancing circuit switchable according to a definite program, in such a manner that each succeeding step compares the residual quantity of the one preceding it.

In converters of that kind, the analogous value may be produced by a plurality of rotary potentiometers each of which has two wipers displaced 180° relatively to each other. These rotary potentiometers are preferably coupled with each other by means of reduction gears and are driven by a common motor. Advantageously the wipers of the rotary potentiometers, which operate at high speed, are removable, and means are provided for making these wipers contact the potentiometers only while balancing actually takes place. Of the two wipers of a potentiometer, the one required for the respective balance can be connected by a control device.

The digital analog converter according to the invention may be fed with digital values of any desired number system.

Figure 1:
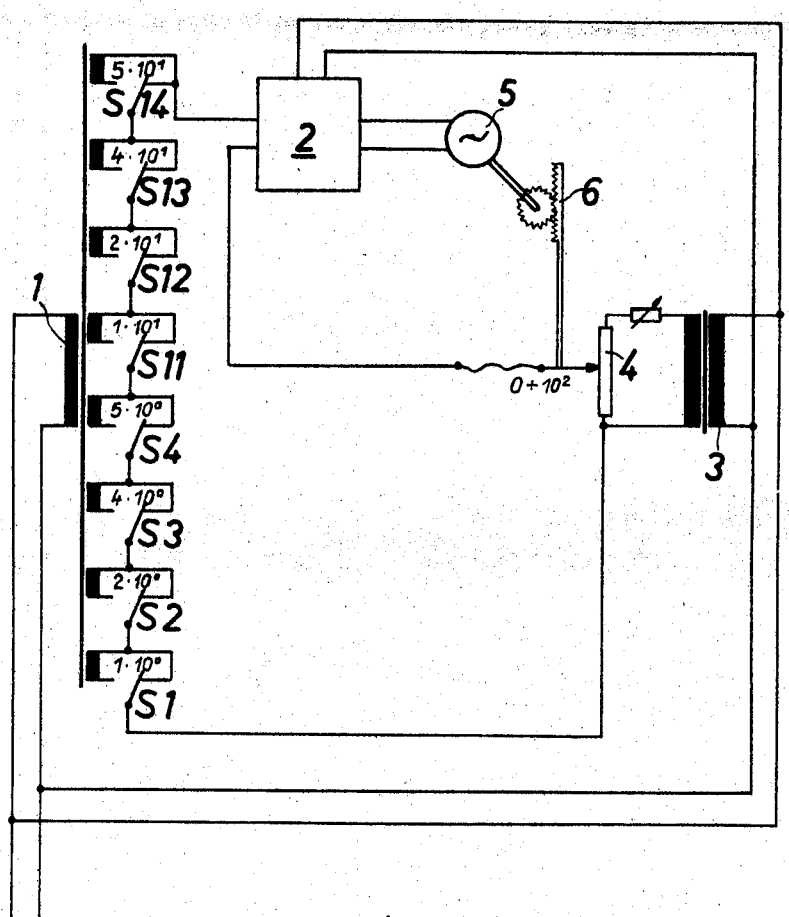
Figure 2:
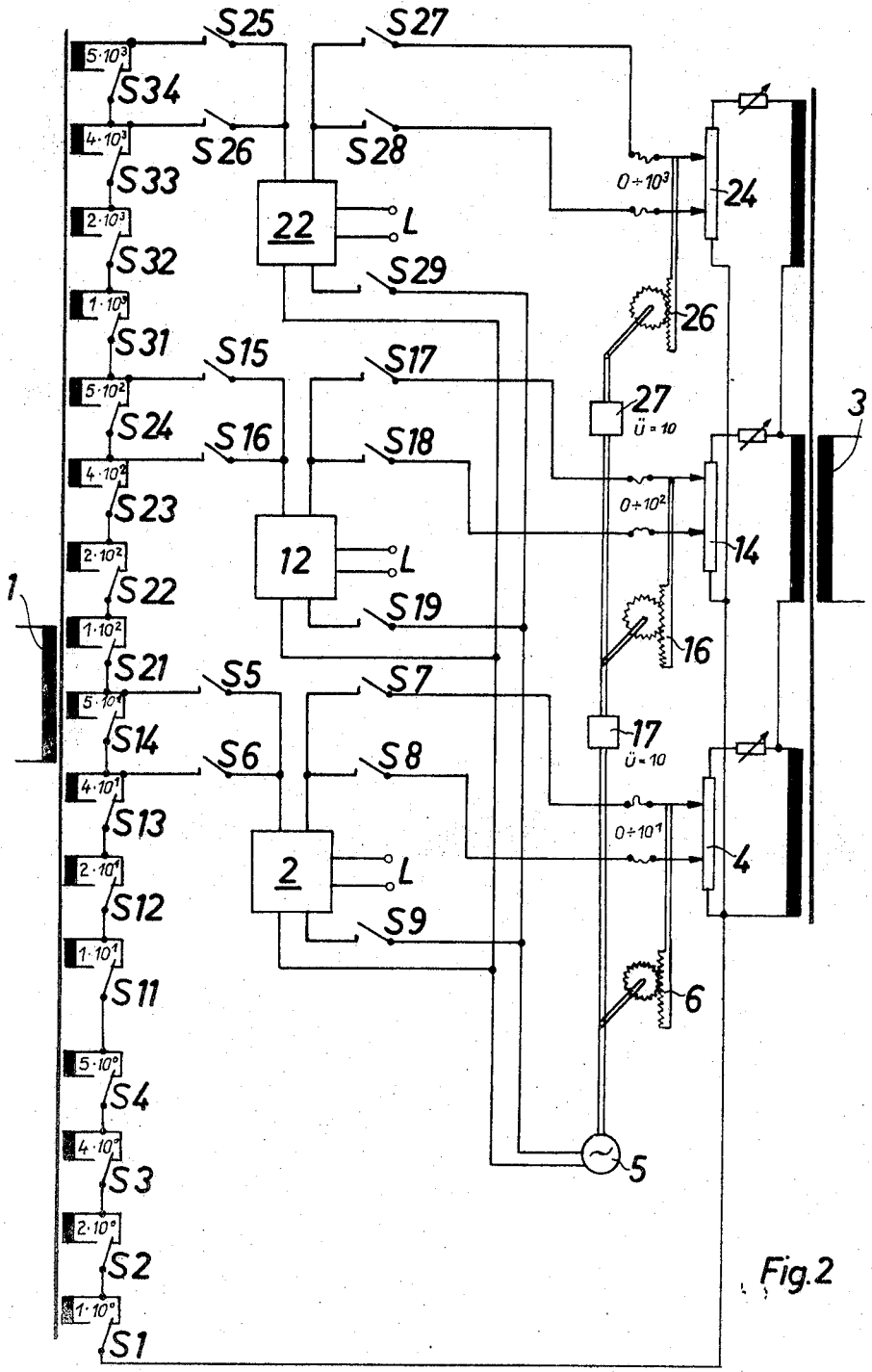
Figure 3:
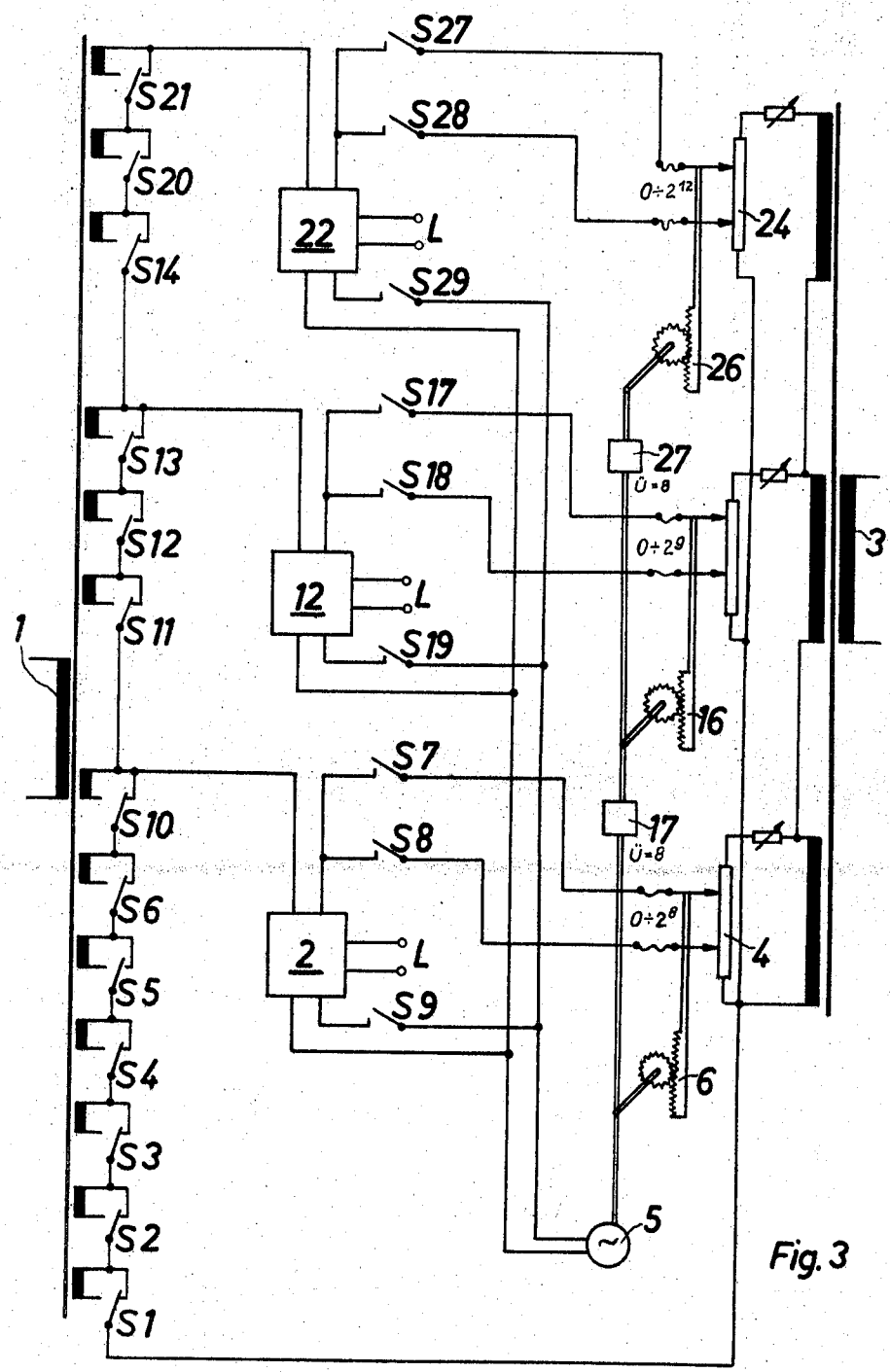

In order that the invention may be more readily understood, reference is made to the accompanying drawings, in which FIG. 1 is a circuit diagram illustrating the general principle of a prior art two-digit analog converter and FIGS. 2 and 3 are circuit diagrams of two embodiments of a digital analog converter according to the invention.

In the diagram of FIG. 1, the digital voltages are produced by a transformer 1. The digital desired value, introduced on the decimal system in this case, is operated by A.C. voltages from the secondary windings of the digital transformer 1. By series connection of single A.C. voltages, an analogous electric value is produced for comparison in a balancing circuit 2 with an analogous electrical real value. In both decades, the numerical inputs from 0 to 100 are operated optionally by means of switches $S_1$ to $S_4$ and $S_{11}$ to $S_{14}$, respectively. These switches, which may be mechanical or electric, connect in series the voltages corresponding to the desired nominal value, thus delivering the analogous compensation voltage. The real value is set at the wiper of a potentiometer 4 which is fed by an analog transformer 3. The wiper of the potentiometer 4 is mechanically connected to a setting element 6 actuated by a motor 5. If the analogous real value set at the wiper of potentiometer 4 does not correspond to the analogous desired value, the balancing circuit 2, which comprises an electrical comparator circuit and a high-gain amplifier for amplifying the difference voltage built up in the comparator circuit, transmits a signal to the motor 5. This signal depends on the direction and magnitude of these two values and by means of the setting element 6 changes the analogous geometric real value and, accordingly, the analogous electric value proportional thereto, until these two analogous values coincide with each other.

Theoretically, the resolving power of a digital analog converter of that kind can be increased to infinity. The chain of digital voltages would in this case have to continue to infinity, and the resolving power of the analogous voltage would be infinitely great. This is of course impossible technically, but a reasonable technical solution will in general provide a maximum resolving power of about one percent.

If digital analog conversion is required to be equal to or to exceed three digits, the analogous geometric quantity is to be split into a plurality of analogous quantities which correspond to the resolving power. Such splitting is possible in the embodiment of a four-digit analog converter shown in FIG. 2. In this circuit arrangement the analogous geometric quantity in conformity with the desired resolving power is fed into three potentiometers 4, 14 and 24 which are mechanically coupled to each other by means of reduction gears 17 and 27, both of which have a reduction ratio of 10:1. The digital values are fed through the switches $S_1$ to $S_4$, $S_{11}$ to $S_{14}$, $S_{21}$ to $S_{24}$, and $S_{31}$ to $S_{34}$. By actuation of the switches $S_{25}$ or $S_{26}$, $S_{27}$ or $S_{28}$, and $S_{29}$, the compensation voltage due to the fed digital values is first compared at the balancing circuit 22 with the real-value voltage produced by the poteniometer 24. Subsequently to balancing, the analogous compensation voltage produced by the fed quantity, minus the first digit, is compared with the real-value voltage which the potentiometer 14 produces in consequence of the connection of the switches $S_{15}$ or $S_{16}$, $S_{17}$ or $S_{18}$, and $S_{19}$. The balancing process is thereafter completed by means of the potentiometer 14 and the balancing circuit 2 in the same manner as before by connecting the switches $S_5$ or $S_6$, $S_7$ or $S_8$, and $S_9$. The balancing operations accordingly take place one after the other with each potentiometer until the desired value and the real value coincide with each other.

The stepping down of the windings within one decade of the digital transformer 1 is dually decimal. Each of the potentiometers 4, 14 and 24 is fully rotatable and has two wipers displaced 180° relatively to each other. Only that wiper of a potentiometer is operated which is determined by a control device when the digital values are being introduced. Because of the zero jumps in the potentiometers it is necessary for each potentiometer to have two wipers. The terminals L at the balancing circuits 2, 12 and 22 are connected to the control device (not shown).

In the embodiment of FIG. 3, the input of digital values is purely dual. Accordingly, the secondary windings of the digital transformer 1 are stepped dually. The analogous geometric quantity is split dually according to the required resolving power. The reducing gears 17 and 27 in this digital analog converter have a ratio 8:1, in conformity with the dual split. In all other respects, the circuit arrangement corresponds to that shown in FIG. 2.

We claim:

1. A digital analog converter comprising:
   a digital transformer,
   means for setting the output voltage of said digital transformer at a desired digital value,
   an analog transformer,
   a plurality of potentiometers,
   a positioning system,
   means for supplying to each of said potentiometers a voltage from the output of said analog transformer,
      the wipers of said potentiometers being mechanically coupled to said positioning system,
         the potentials at said wipers corresponding to the real position of said positioning system,
   a plurality of balancing circuits corresponding to said potentiometers for comparing said wiper potentials with said desired values, and
   switching elements by means of which the voltages of the entire desired value and the wiper potential of each of said potentiometers can be applied to said balancing circuits in chronological sequence from the highest digit to the lowest in such a manner that each step compares the residual quantity of the step preceding it.

2. A digital analog converter comprising:
   a digital transformer,
   means for setting the output voltage of said digital transformer at a desired digital value,
   an analog transformer,
   a plurality of potentiometers,
   a positioning system,
   means for supplying to each of said potentiometers a voltage from the output of said analog transformer,
      the wipers of said potentiometers being mechanically coupled to said positioning system,
         the potentials at said wipers corresponding to the real position of said positioning system,
   a balancing circuit for comparing said wiper potentials with said desired values, and
   switching elements by means of which the voltages of the entire desired value and the wiper potential of each of said potentiometers can be applied to said balancing circuit in chronological sequence from the highest digit to the lowest in such a manner that each step compares the residual quantity of the step preceding it.

3. A digital analog converter as claimed in claim 1, wherein said potentiometers are rotary potentiometers each of which has two wipers displaced 180° relatively to each other.

4. A digital analog converter as claimed in claim 1, wherein said rotary potentiometers are coupled with each other by means of reduction gears and are driven by a common servomotor.

5. A digital analog converter as claimed in claim 1, wherein said wipers of said rotary potentiometers, operating at high speeds, are removable, and wherein means are provided for making the wipers contact the potentiometers only while balancing actually takes place.

6. A digital analog converter as claimed in claim 3, wherein a control device connects to said balancing circuit only the wiper required for balancing.

References Cited

UNITED STATES PATENTS

| | | | |
|---|---|---|---|
| 2,738,504 | 3/1956 | Gray | 340—347 |
| 2,814,006 | 11/1957 | Wilde | 340—347 |
| 2,915,688 | 12/1959 | Wilde | 340—347 |
| 2,969,534 | 1/1961 | Fisher | 340—347 |
| 2,970,308 | 1/1961 | Stringfellow | 340—347 |
| 2,980,899 | 4/1961 | Kate | 340—347 |
| 3,064,168 | 11/1962 | Dosch | 340—347 |
| 3,133,233 | 5/1964 | Peterson et al. | 340—347 |
| 3,165,952 | 1/1965 | Thompson et al. | 340—347 |

MAYNARD R. WILBUR, Primary Examiner

G. R. EDWARDS, Assistant Examiner